(12) United States Patent
Odenthal et al.

(10) Patent No.: US 9,103,503 B2
(45) Date of Patent: Aug. 11, 2015

(54) DEVICE FOR INJECTING GAS INTO A METALLURGICAL VESSEL

(75) Inventors: Hans-Juergen Odenthal, Mettmann (DE); Jochen Schlueter, Dortmund (DE); Herbert Olivier, Aachen (DE)

(73) Assignee: SMS SIEMAG AG, Duesseldorf (DE)

( * ) Notice: Subject to any disclaimer, the term of this patent is extended or adjusted under 35 U.S.C. 154(b) by 36 days.

(21) Appl. No.: 13/637,134

(22) PCT Filed: Mar. 28, 2011

(86) PCT No.: PCT/EP2011/054759
§ 371 (c)(1),
(2), (4) Date: Jan. 4, 2013

(87) PCT Pub. No.: WO2011/120937
PCT Pub. Date: Oct. 6, 2011

(65) Prior Publication Data
US 2013/0106034 A1   May 2, 2013

(30) Foreign Application Priority Data

Mar. 31, 2010   (DE) .......................... 10 2010 013 769
Oct. 8, 2010   (DE) .......................... 10 2010 047 969

(51) Int. Cl.
*C21B 11/10*   (2006.01)
*F17D 1/02*   (2006.01)
(Continued)

(52) U.S. Cl.
CPC ................ *F17D 1/02* (2013.01); *C21C 5/4606* (2013.01); *C21C 5/4673* (2013.01); *F27D 3/16* (2013.01); *F23C 2900/07021* (2013.01)

(58) Field of Classification Search
CPC ... F27D 3/16; F27D 17/008; F27D 2003/164; F27D 2003/169; F27D 3/18; F27D 99/0005; F27B 3/225; F27B 7/36; F27B 5/16; H01J 37/3244; C21B 5/001; C21B 7/16; B22D 1/005; C21C 5/4606; C21C 5/4613; C21C 5/48; F17D 1/02; C22B 9/05; F23C 2900/07021
USPC ........... 266/99, 222, 217, 265, 268, 266, 220, 266/225, 188; 110/182.5
See application file for complete search history.

(56) References Cited

U.S. PATENT DOCUMENTS 3,627,295 A * 12/1971 Doi et al. ......................... 266/99
3,771,473 A * 11/1973 Borgnat et al. ............. 110/182.5
(Continued)

FOREIGN PATENT DOCUMENTS

DE           23 42 003           4/1974
DE   20 2004 004 976 U           8/2004
(Continued)

*Primary Examiner* — Scott Kastler
*Assistant Examiner* — Michael Aboagye
(74) *Attorney, Agent, or Firm* — Abelman, Frayne & Schwab (57) ABSTRACT

The invention relates to a device for injecting gas into a metallurgical vessel, comprising a blowing head (5) having a feed line (5b) for delivering gas, in particular oxygen, to the blowing head (5), and at least one Laval nozzle (1) disposed on the blowing head (5), said nozzle having an inlet section (2) which conveys the gas and an outlet section (3), wherein the gas is delivered to the inlet section (2) via the feed line (5b) and leaves the outlet section (3) at supersonic speed, wherein the Laval nozzle (1) comprises at least one first nozzle part (2, 3) and a second nozzle part (7), wherein the nozzle parts (2, 3, 7) are adjustable relative to one another by changing the geometry of the Laval nozzle (1).

9 Claims, 5 Drawing Sheets

(51) Int. Cl.
*C21C 5/46* (2006.01)
*F27D 3/16* (2006.01)

(56) References Cited

U.S. PATENT DOCUMENTS

| | | | |
|---|---|---|---|
| 3,917,243 A | | 11/1975 | Borgnat |
| 4,190,238 A | * | 2/1980 | Schoop et al. ............. 266/270 |
| 4,702,462 A | * | 10/1987 | Fritz ............................ 266/225 |
| 4,730,784 A | * | 3/1988 | Bock et al. ............. 239/416.4 |
| 6,284,189 B1 | | 9/2001 | Pavlicevic |
| 6,322,610 B1 | | 11/2001 | Pavlicevic |
| 6,558,614 B1 | | 5/2003 | Fritz |
| 7,384,594 B2 | * | 6/2008 | Meyn et al. ............... 266/222 |
| 2012/0067983 A1 | | 3/2012 | Czingon |

FOREIGN PATENT DOCUMENTS

| | | | | |
|---|---|---|---|---|
| EP | 05-1239190 510518 | | 10/1992 | |
| GB | 1198112 | * | 7/1970 | ............... C21C 5/46 |

* cited by examiner

DEVICE FOR INJECTING GAS INTO A METALLURGICAL VESSEL

RELATED APPLICATIONS

This application is a national stage application of International application PCT/EP2011/054759 filed Mar. 28, 2011 and claiming priority of German applications DE 10 2010 013 769.3 filed Mar. 31, 2010 and DE 10 2010 047969.1 filed Oct. 8, 2010, all of the three applications being incorporated herein by reference thereto.

BACKGROUND OF THE INVENTION

1. Field of the Invention

The invention relates to a device for injecting gas into a metallurgical vessel having a blowing head having a feed line for delivering gas, particularly oxygen, to the blowing head, and at least one Laval nozzle, which is arranged on the blowing head and has an inlet section which conveys the gas and an outlet section with the gas being delivered to the inlet section via the feed line and leaving the outlet section at supersonic speed.

2. Description of the Prior Art

In many steel production methods, for example, in the basic oxygen furnace method ("BOF") or the argon oxygen decarburization method ("AOD"), it is provided to move a lance from above into a metallurgical vessel or converter, in order to blow a gas, such as oxygen, from a defined distance onto a metal melt. The lances have blowing heads that usually have several outlet nozzles, from which the gas for generating an oscillating blowing depression flows at supersonic speed onto the metal melt. Such lances and blowing heads have a limited lifespan, wherein nozzles undergo wear for reasons including compression shocks and/or contact of the nozzle margins with the hot and reactive environment in the converter.

SUMMARY OF THE INVENTION

The problem of the invention is to provide a device for injecting gas into a metallurgical vessel, whose tool life is improved.

For a device according to the invention, as mentioned in the introduction, this problem is solved by providing a Laval nozzle having at least one first nozzle part and one second nozzle part, with the nozzle parts being mutually adjustable under a change in the geometry of the Laval nozzle. Due to the adjustability of the nozzle parts with modification of the geometry of the Laval nozzle during the operation, it is possible to achieve an adaptation to changing parameters, such as the nozzle system pressure, the gas volume flow rate or the counter pressure after the nozzle exit. As a result, the operation of the Laval nozzle at all times is at an optimal working point, so that disturbances in the gas flow in or after the outlet area can be at least reduced.

A blowing head in the sense of the invention denotes particularly a structure at the end of a lance. Here, the lance can be moved into a metallurgical vessel, in order to expose a metal melt located in the metallurgical vessel to gas, particularly oxygen. The vessel is preferably a converter, for example, for steel production. However, in principle, another vessel can also be used, for example, for melting scrap metal in an electric arc furnace ("EAF"). Depending on the application or requirement, the blowing head can comprise either one or also several Laval nozzles. It can be used for the following metallurgical aggregates, among others: BOF and AOD converters, combustion and injector nozzles for the electric arc oven (EAF), combustion and injector nozzles for the reduction oven, and nozzles for vacuum process installations (VOD, RH).

In a preferred embodiment of the invention, the change in the geometry comprises a change of a smallest throughput diameter between the inlet section and the outlet section. The smallest throughput diameter of a Laval nozzle is one of the essential parameters in its design and can be influenced in a simple manner.

In general, it is advantageous to design the first nozzle part as a channel that is rotation symmetrical about a channel axis, wherein the second nozzle part is configured as a mandrel member protruding along the channel axis into the channel. As a result, the nozzle geometry can be influenced in a simple manner by shifting the mandrel. In a particularly preferred variant, the mandrel member has a tapering tip, wherein the tapering tip extends into an area of smallest throughput diameter of the channel. In this manner, a smallest throughput diameter of the Laval nozzle can be changed in a particularly simple and precise manner by shifting the mandrel member parallel to the channel axis. In addition, the tapering tip of the mandrel member, tip which may have a conical shape, for example, should be shaped in such a manner that the generation of turbulence in the gas flow is reduced.

In a preferred variant, the mandrel member can be shifted via an adjustment drive along the channel axis, in order to allow a defined setting of the nozzle geometry. In a possible variant, the adjustment drive here comprises a hydraulic or pneumatic actuator. In an alternative or complementary variant, the adjustment drive comprises an electrical drive which, in a preferred but not necessary detail configuration, comprises an electrical energy storage in the area of the blowing head. By means of such an energy storage, it is possible to entirely or partially dispense with feed lines of the adjustment drive, which are led through the often very long lance.

It is generally advantageous to arrange in the area of the blowing head an electrical pressure sensor, by means of which the pressure of the gas can be communicated, for example, as an electrical signal, to a control electronics unit. Depending on changes in the gas pressure, the geometry of the Laval nozzle can be traced by adjusting the nozzle parts.

In an alternative embodiment of the invention, the adjustment drive comprises a mechanism operated by the pressure of the gas. It is advantageous, although not necessary, to dispense with feed lines of the adjustment drive in this case.

In a generally advantageous detail configuration of the invention, the adjustment drive can be detachably secured on the blowing head. As a result, the adjustment drive can be used repeatedly, wherein the blowing head is considered a wearing part. In particular, an adjustment drive according to the invention can be designed in such a manner that it is usable in conventional blowing heads, optionally after an appropriate reworking of the conventional blowing heads.

In a generally advantageous embodiment of the invention, several Laval nozzles are arranged on the blowing head, each of the nozzles comprising adjustable second nozzle parts. In a particularly preferred variant, movable nozzle parts, for example, mandrel members, of several or all the Laval nozzles can be simultaneously adjusted here using the same adjustment drive.

Additional advantages and characteristics of the invention result from the embodiment examples described below as well as from the dependent claims.

BRIEF DESCRIPTION OF THE DRAWINGS

Below, several preferred embodiment examples of the invention are described and further explained in reference to the appended drawings.

DETAILED DESCRIPTION OF THE PREFERRED EMBODIMENTS

The Laval nozzle is operated with oxygen entering into a hot environment with $Tu=1650°$ C.

The metallurgical vessel preferably is a converter (BOF—Basic Oxygen Furnace; AOD—Argon Oxygen Decarburization) for steel or stainless steel production. However, in principle, another metallurgical vessel can also be used, for example, an electrical arc furnace (EAF) for melting scrap metal.

In many methods for steel production, for example, the BOF method, it is provided to move a blowing lance (short form: lance) from above into a metallurgical vessel, for example, into a converter, in order to blow a gas, usually oxygen, from a defined distance onto a metal melt. Located in the blowing head are several Laval nozzles, arranged at a certain angle, which accelerate the oxygen to supersonic speed. The blowing head is cast or forged from copper, and it is welded to the approximately 20 m long lance. The lance and the blowing head are cooled by circulating water under high pressure, wherein the water feed occurs through an annular channel in the lance interior, and the water return flow through an annular channel in the lance exterior.

The oxygen exits the nozzles of the blowing head at a speed approximately twice the speed of sound, and with high momentum; then, after approximately 1.4 m (which corresponds to the minimum work position of the blowing lance above the melt bath, depending on the nozzle setting angle, among other factors) to 3.5 m (which is the maximum lance position above the melt bath, which is set only at the beginning of the blowing with the purpose of preventing the placement of the blowing lance on the scrap metal) it strikes the melt, generates an oscillating blowing depression, and ensures the desired decarbonization reaction in the form $C+1/2\ O_2 \rightarrow CO$. Due to the expansion in the divergent nozzle part, the oxygen cools up to the nozzle exit to approximately $-100°$ C., as a result of which the nozzles are intensely cooled both from the water side and also from the gas side.

A Laval nozzle consists of a tapering, so-called convergent, inflow area and a broadening, a so-called divergent, outflow area; the term convergent-divergent nozzle (CD nozzle) is encountered frequently, instead of supersonic or Laval nozzle. The gas is accelerated in the convergent part, and, given appropriate pressure ratios in the narrowest cross section (nozzle throat, throat) between the convergent and divergent parts, it reaches sonic speed for the first time and it expands in the divergent portion to supersonic speed. The parameters relating to flow technology in the inlet of the nozzle are marked with the index "0," in the narrowest cross section with "*" and in the outlet with "e". The hot environment is located downstream of the nozzle, index "u."

Each Laval nozzle can be designed, with regard to the given design parameters of flow technology, 1. Oxygen volume flow $\dot{v}$,
 2. Inlet pressure of the oxygen into the Laval nozzle $p_0$,
 3. Static counter pressure in the converter or metallurgical vessel $p_u$, only for just one design point, in which the nozzle functions optimally. If all the nozzles in the blowing head are operated exactly in the design point, the oxygen jets are applied up to the nozzle exit to the nozzle wall, the cooling water feed is properly maintained, and there is no formation of skull on the blowing head, and nozzle wear is consequently minimal. In this case, useful lives of the blowing lance of up to 800 melts can be achieved. Otherwise, the lifespan of the blowing heads is limited, wherein wear of the nozzles occurs for reasons including shock waves and/or contact of the nozzle margins with the hot and reactive environment in the converter.

The wearing mechanism is explained below:

In daily steel mill operation, the flow technology design parameters $\dot{v}$, $p_o$ and $p_u$ often have to be varied, in order to be able to react to unforeseen processing events (ejection of steel and connecting rod from the converter exit, pressure variations in the oxygen network, addition of cooling ore during the main blowing phase) and ongoing processing events (sampling using a sub-lance during the blowing operation). As a result, the nozzle flow deviates for a duration of varying length from the ideal design state. Inside and outside of the nozzle, complex flow patterns (diamond pattern) in the form of shock waves and expansion waves form, which lead to the wear of the nozzle edge.

Figure 8:
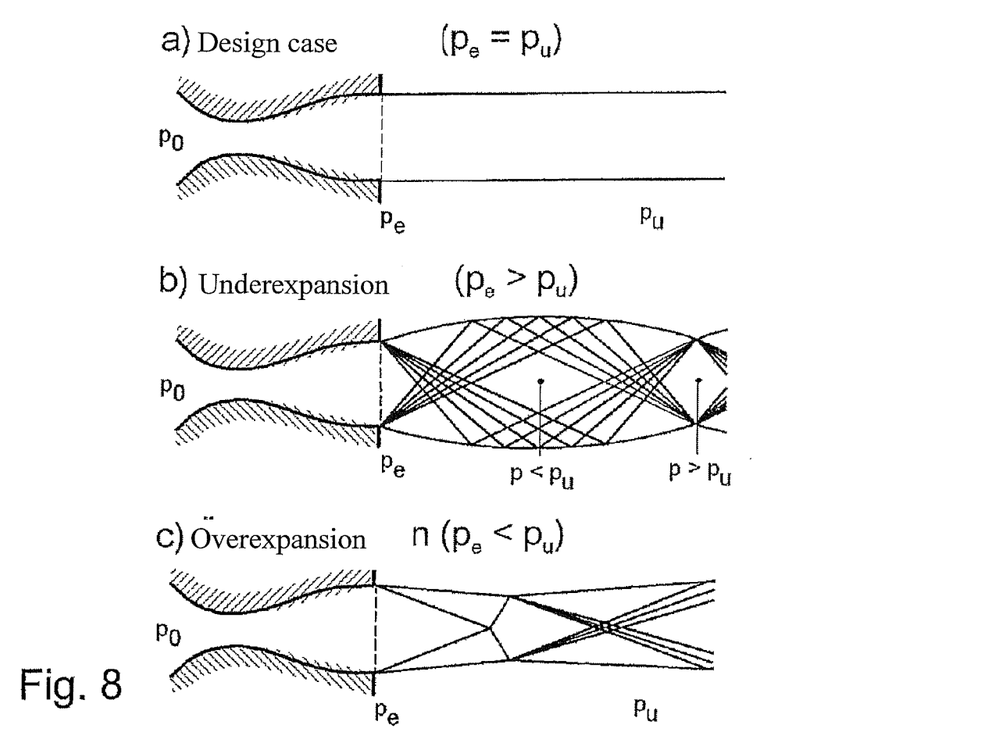
FIG. 8 shows the qualitative flow structure inside and outside of a Laval nozzle in the
 a) design state,
 b) noncritical state, and
 c) supercritical state.

FIG. 8 shows the influence of the pressure ratio $p_o/p_u$ on the flow structure in the oxygen jet.

The nozzle is considered to be adapted if the exit pressure $p_e$ is equal to the ambient pressure $p_u$.

In accordance with the isentropic flow filament theory, the pressure ratio, in FIG. 8a, between the narrowest cross section and the inlet assumes a certain value, and for oxygen one gets $p^*/p_o=0.528$. Similar statements also apply to the temperature ratio and the density ratio. The length of the supersonic jet is at a maximum, and the oxygen jet impinges with maximum momentum on the steel melt for a given nozzle geometry.

The nozzle is considered not to be adapted, if the pressure $p_e$ in the exit cross section deviates from the ambient pressure $p_u$, (this is the static pressure in the converter). In contrast to the subsonic jet, which always exits at constant pressure at the nozzle exit, because the exit pressure has a regulating effect on the flow, the supersonic jet can flow out not only against constant pressure and against a negative pressure of any level, but also to a certain extent against positive pressure.

If $p_e > p_u$, see underexpansion in FIG. 8b, this requires a secondary expansion behind the exit cross section. At the nozzle exit margin, expansion waves start, and the jet expands outside of the nozzle. The intersecting waves of the expansion air wheel are reflected at the free jet boundary as compression waves. In the jet core, the pressure downstream of the expansion waves is lower than the ambient pressure (p<p_u), and downstream of the compression waves it is higher than the ambient pressure (p<p_u). The periodic interaction of expansion and compression continues until subsonic speed is reached.

If $p_e<p_u$, see overexpansion in FIG. 8c, a system of slanted shock waves originates from the exit margins of the nozzle. A shock wave is associated with an inconstant change of the parameters, pressure p, temperature T, density ρ, entropy s, Mach number Ma, and flow speed u. While p, T, ρ and s increase, Ma and u decrease. Behind the vertical shock wave, the speed is always subsonic. The free jet is constricted, and the pressure in the jet center increases downstream to values above the counter pressure. The shock waves are reflected at the free jet margin of the gas jet as expansion waves, and the static pressure in the jet decreases. This process repeats periodically, until the growing mixing zones at the jet margin dominate the flow field and the supersonic jet is converted into a subsonic jet.

As a result of the slanted shock waves, an irregular unsteady site at which the flow tears off forms at the nozzle exit. A local recirculation region develops. The actual outlet cross section now lies in the nozzle, and it no longer fits the exit pressure $p_e$ of the geometric cross section of the outlet. The outlet area is determined by the position of the tear off margin. As a result, hot process gas can reach the nozzle and the copper wall, from the converter via the recirculation region. The cooling effect is lowered and local wear is increased. Once wearing has started to occur at a certain site at the diffuser outlet, this site is also exposed particularly intensively to converter gas during the further operation of the converter. The copper increasingly undergoes wear due to the continuously enlarging recirculation region. The risk of a water breakthrough increases.

While nozzles that are underexpanded ($p_e>p_u$) are not of critical importance with regard to wear, the lifespan rapidly decreases in case of overexpanded nozzles ($p_e<p_u$), that is to say in the case of lances operated at excessively low nozzle system pressure, owing to the absence of a cooling effect due to the expanded oxygen. In this case, the local pressure can be raised to the ambient pressure only via shock waves. Here, it does not matter whether $p_u$, or $p_o$ is varied, because in each case the mutually adapted values $p^*/p_o$ and $A^*/A_e$ of the design state are changed.

On this background, the problem of the invention is to provide a device for injecting gas into a metallurgical vessel, whose useful life is clearly improved. The device generates a nozzle flow which is adapted to the predominating flow conditions, free of disturbances, and consequently with minimal wear, while, at the same time, the metallurgical operating conditions are improved, because they are reproducible.

As a result of the adjustability according to the invention of the geometry of the Laval nozzle, the nozzle contour can be adapted to changing flow conditions, such as the gas volume flow v̇, the gas inlet pressure into the Laval nozzle $p_o$, or the static counter pressure $p_u$ in the converter. As a result, the operation of the Laval nozzle always occurs at the optimal working point, so that disturbances in the gas flow in or after the outlet area are avoided or at least decreased.

A Laval nozzle is designed for the design state (nominal operating state), in which there are no disturbances in the flow at the nozzle exit, that is to say in the absence of secondary compression or secondary expansion. In this case, the pressure in the nozzle jet is equal to the ambient pressure.

Figure 1:
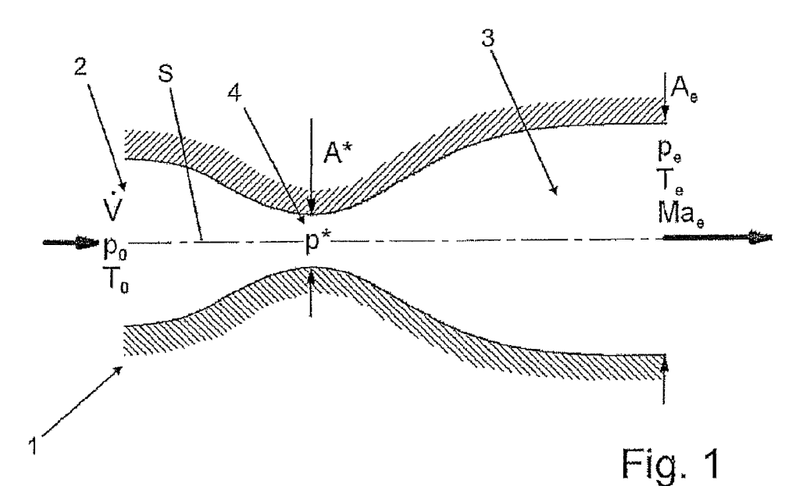
FIG. 1 shows a diagrammatic cross-sectional view of a Laval nozzle.

In FIG. 1, a general, conventional Laval nozzle 1 is shown, which comprises a convergent inlet area 2 and a divergent outlet area 3. The Laval nozzle 1 is configured as a channel with rotational symmetry about the axis S, channel which, between the convergent part 2 and the divergent part 3, has an area of narrowest cross section 4 with a minimum cross-sectional area A*. At the end of the divergent part 3, the nozzle has a cross-sectional area $A_e$, where $A_e>A^*$.

A gas that flows into the convergent part at the rest pressure $p_o$ and the rest temperature $T_0$, for example, oxygen, flows with volume flow v̇ in the Laval nozzle in the known manner, and it exits the outlet area at supersonic speed (Mach number Ma>1) into an outlet-side ambient pressure $p_u$. For the adapted nozzle, the area ratio $A^*/A_e$ is a function of the pressure ratio $p_u/p_o$, wherein, assuming a quasi-one dimensional, isentropic nozzle flow, this relation is as follows:

$$\frac{A^*}{A_e} = \frac{\left(\frac{p_u}{p_0}\right)^{\frac{1}{\gamma}} \cdot \sqrt{1 - \left(\frac{p_u}{p_0}\right)^{\frac{\gamma-1}{\gamma}}}}{\sqrt{\frac{\gamma-1}{2}\left(\frac{2}{\gamma+1}\right)^{\frac{\gamma+1}{\gamma-1}}}} \quad (1)$$

i.e., $$\frac{A^*}{A_e} = f\left(\frac{p_u}{p_0}\right)$$

Replacing the pressure ratio with the Mach number, one gets $$\frac{A^*}{A_e} = \frac{Ma_e}{\left[\frac{2}{\gamma+1}\left(1 + \frac{\gamma-1}{2}Ma_e^2\right)\right]^{\frac{\gamma+1}{2(\gamma-1)}}} \quad (2)$$

with the isentropic exponent γ, which is approximately 1.4 for oxygen.

Taking into account the isothermal state equation, one gets for the mass flow through the nozzle:

$$\dot{m} = \rho_N \dot{V}_N = \rho * u * A \sim \frac{p_0}{\sqrt{T_0}} \cdot A^* \quad (3)$$

Here, $\rho_N$ is the standard density and $\dot{V}_N$ the standard gas volume flow. Equation (3) shows the dependency of the mass flow ṁ on the rest pressure $p_0$. At constant values for the rest temperature $T_0$, the throat cross section A*, and the ambient pressure $p_u$, the mass flow m decreases with increasing rest pressure $p_0$, i.e., the nozzle then no longer operates in the design state.

Figure 7:
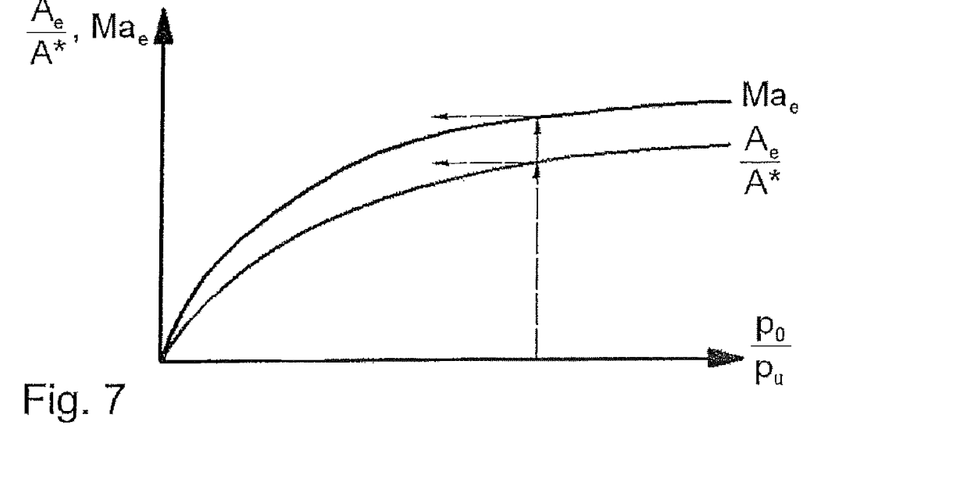
FIG. 7 shows the basic relation between the surface ratio $A_e/A^*$ or the exit Mach number $Ma_e$ and the pressure ratio $p_o/p_u$ for the adapted Laval nozzle flow.

FIG. 7 illustrates these relations on the basis of the pressure ratio $p_0/p_u$. If the rest pressure $p_0$ decreases, then the pressure ratio $p_0/p_u$ also decreases for a constant ambient pressure $p_u$. If the nozzle has to be continued to be operated in the adapted mode, then the area ratio $A_e/A^*$ has to be reduced. When the rest pressure $p_0$ increases above the design value, the area ratio $A_e/A^*$ has to be increased accordingly. In the present invention, this occurs by inserting a mandrel into the narrowest cross section A*.

Figure 2:
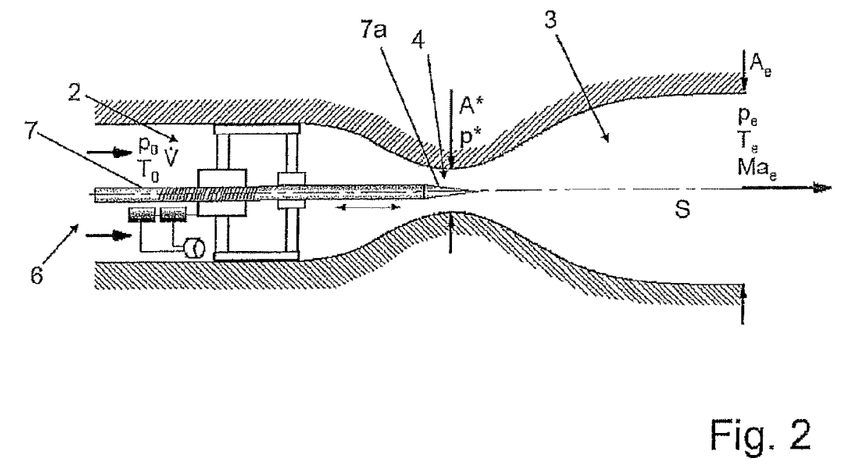
FIG. 2 shows a diagrammatic cross-sectional view of a Laval nozzle of a first embodiment example of a device according to the invention.

In a first possible embodiment of the invention according to FIG. 2, the Laval nozzle 1 overall is arranged in a blowing head 5, wherein the gas is fed through feed lines 6 to the inlet area 2. The blowing head is set at the end of a lance (not shown), which can be moved into a metallurgical vessel (not shown), particularly a converter (BOF/AOD) for steel production.

The nozzle 1 shown in FIG. 2 has a first nozzle part, which comprises the channel formed by the inlet area 2 and the outlet area 3.

A second nozzle part 7 is configured as a mandrel member, which is shaped as a cylinder with a conically tapering tip 7a, and which is arranged rotation symmetrically about the axis S. The mandrel member 7 is movable along the axis S relative to the first nozzle parts 2, 3, wherein, depending on the position of the mandrel member 7, the tip 7a protrudes to a varying extent into the area of the smallest throughput cross section 4. Accordingly, the area A* of the smallest throughput cross section is variable via the position of the mandrel member 7, so that the geometry of the Laval nozzle is adjustable in a targeted manner. According to equations (1) and (2), it is thus possible to react to changes of the external parameters, such as, for example, the inlet-side gas pressure $p_0$, by adaptation of the nozzle geometry.

Figure 3:
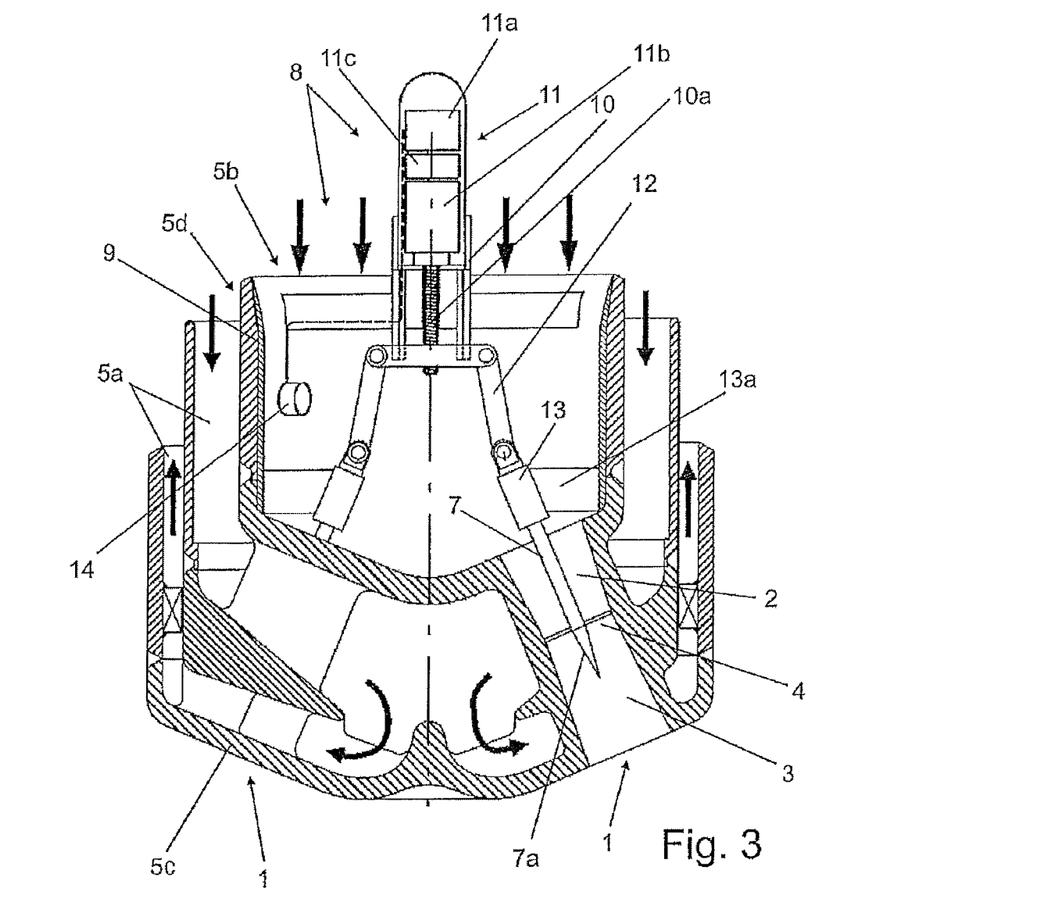
FIG. 3 shows a cross-sectional view of a blowing head of a second embodiment example of a device according to the invention.

FIG. 3 shows an additional embodiment example of the invention, in which the basic principle of a device according to the invention, as diagrammatically shown in FIG. 2, includes several construction design details.

A largely conventional blowing head 5 is represented, as used on the tip of lances (not shown) for oxygen injection in the converter. This relates particularly to the usual BOF and AOD methods for steel production. The blowing head 5 has lateral coolant channels 5a, which are exposed to cooling water in a known manner. The gas feed through the lance occurs in a gas channel 5b.

In a solid terminal area 5c of the blowing head 5, several Laval nozzles 1 or nozzle parts in the sense of the invention are incorporated. In this case, five Laval nozzles are provided which are directed outward at equal angular separation with respect to each other, and at an inclination with respect to a center axis of the blowing head.

In a central area 5d of the blowing head, an adjustment drive 8 is detachably secured, for example, by means of headless screws (not shown). The adjustment drive 8 comprises in this case a cylindrical housing 9, a die 10 which can be moved parallel to the center axis of the blowing head, and an electrical drive 11.

The die 10 can be positioned, for example, by means of a fine thread 10a using the electrical drive 11. On the die, five connecting rods 12 are attached, each of which is linked at its other end to one of five mandrel members 7. Each one of the mandrel members 7 is slidingly mounted in a linear guide 13 secured on the housing 9 via an arm 13a, and opens with its tip 7a into one of the five Laval nozzles 1. The guides 13 guide the mandrel members 7 here in each case centrally about a respective symmetry axis of the channel-shaped first nozzle parts 2, 3.

Due to the adjustment of the die 10, all the mandrel members or second nozzle parts 7 are retracted simultaneously into the first nozzle parts 2, 3 to varying extents, so that all the Laval nozzles can subsequently be retraced by only one drive unit 11.

In the area of the adjustment drive 8, an electrical pressure sensor 14 is arranged additionally, by means of which the instantaneous inlet-side pressure of the Laval nozzles 1 can be determined, in order to retrace the nozzle geometry to optimize the outlet-side gas jet.

Various approaches are suitable for the supply and control of the adjustment drive. For example, the supply and/or signal lines for the connection to the electrical drive 11 and/or pressure sensor 14 can be led through the lance to the blowing head 5. However, it is particularly preferable to provide additionally, in the blowing head, an electrical energy storage 11a, which supplies an electrical motor 11b and/or a control electronics system 11c and/or the sensor 14 with energy. As a result, it is possible to dispense with the feed lines entirely or partially. In particular, but not exclusively, the following variants are possible:

The electrical pressure sensor 14, optionally supplied by the energy storage 11a, directly regulates the drive unit 11. For this purpose, an appropriate control electronics system 11c can be provided in the blowing head.

The electrical pressure sensor 14, optionally supplied by the energy storage, sends out the pressure signal. The regulation of the drive unit then occurs wirelessly via an external control computer.

The pressure is determined by a thin steel pipe arranged in the interior of the lance, and measured on a lance slide with a pressure difference recorder. This signal is transmitted preferably wirelessly to the control computer, which in turn controls the drive unit.

The adjustment drive 8 together with the mandrel members 7 and the housing 9 in this case can be inserted in the blowing head 5, or removed therefrom. This enables in particular the combination with conventional blowing heads. Here it is possible, although not necessary, to rework the conventional blowing heads, for example, by boring a central holding area for the adjustment drive.

In the case of a replacement of the blowing head, all the lines (electrical lines, or also pneumatic or hydraulic lines in other embodiments) are preferably connected and disconnected using plugs or couplings.

The individual mandrel members or second nozzle parts 7 are exchangeably connected as wearing parts to the adjustment drive 8.

Figure 4:
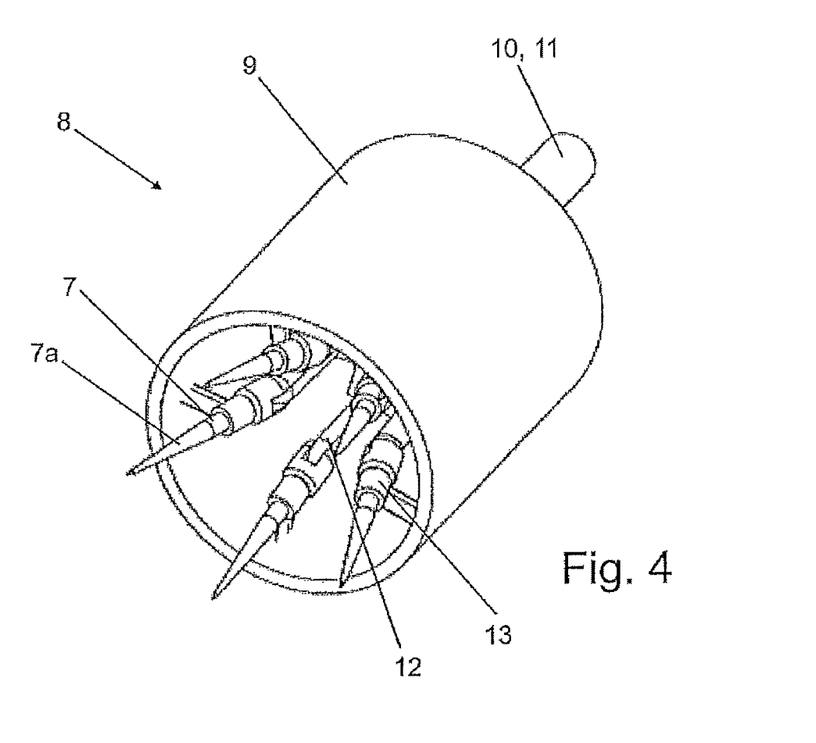
FIG. 4 shows a three-dimensional view of an adjustment drive of the device of FIG. 3 from the front.
Figure 4A:
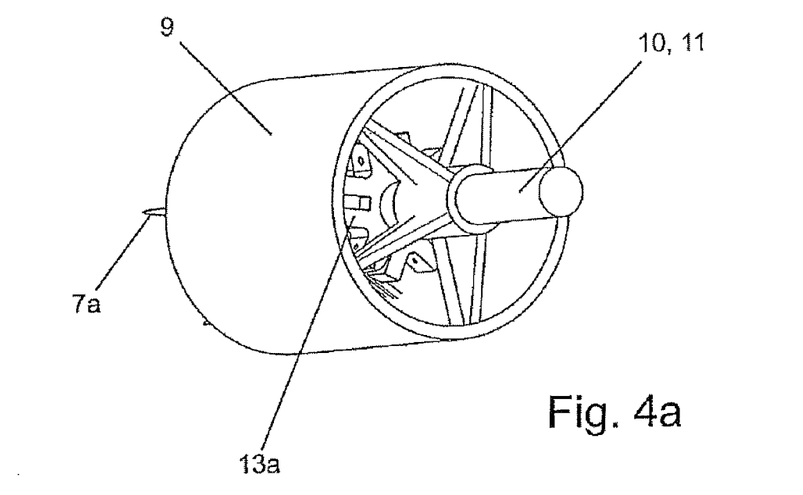
FIG. 4a shows a three-dimensional view of an adjustment drive of the device of FIG. 3 from the back.

FIG. 4 and FIG. 4a show the pot-shaped reusable insert.

Figure 5:
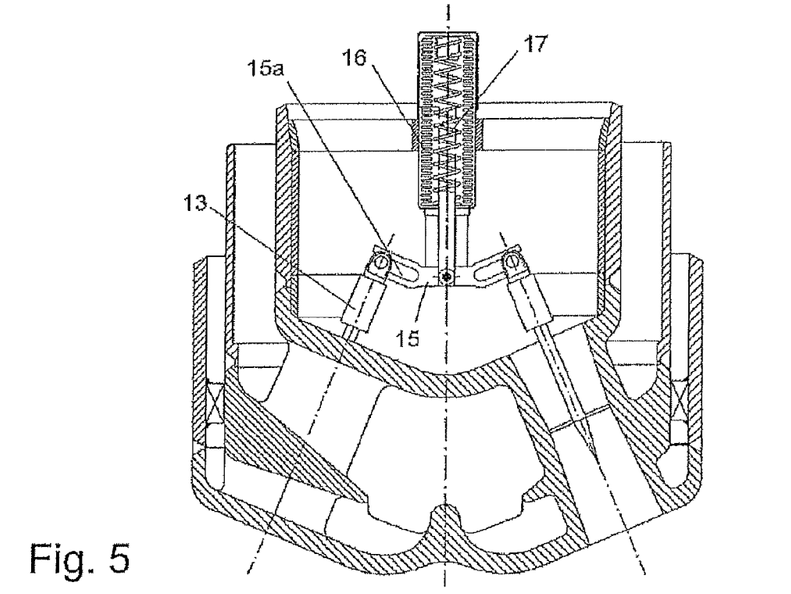
FIG. 5 shows a cross-sectional view of a blowing head of a third embodiment example of a device according to the invention in a first operating state.
Figure 6:
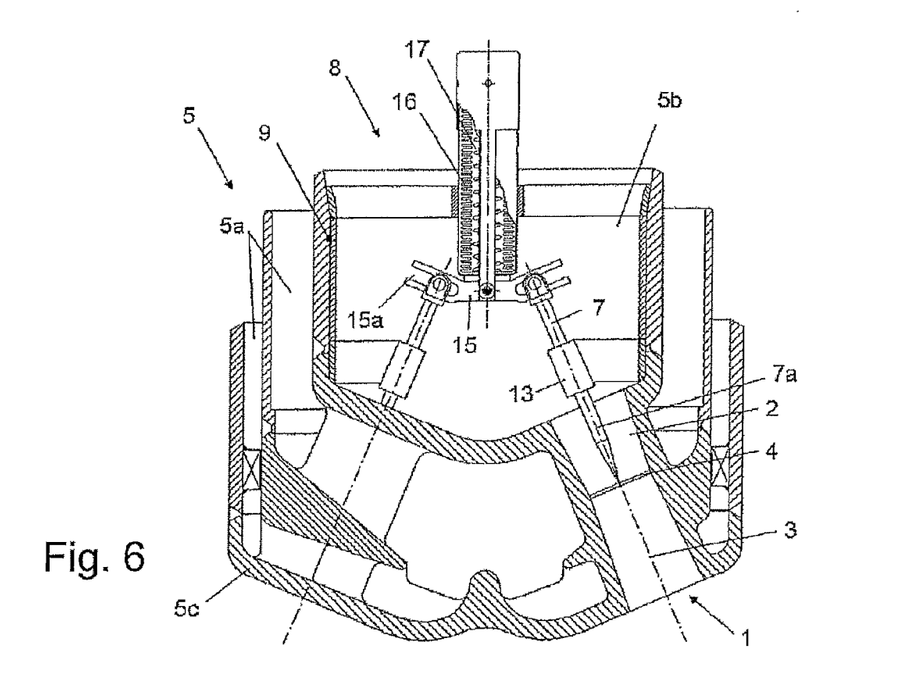
FIG. 6 shows the blowing head of FIG. 5 in a second operating state.

FIG. 5 and FIG. 6 show an additional embodiment example, in which the blowing head 5, as in the example according to FIG. 3, comprises five first nozzle parts 2, 3 with second nozzle parts or mandrel members 7 which are linearly adjustable therein.

In contrast to the previous embodiment example, the mandrel members 7, on the drive side, are each connected with a common guide arm 15 with connecting members 15a provided therein. A shifting of the guide arm 15 along the center axis of the blowing head 5 leads accordingly to a shifting of the mandrel members 7 in linear guides 13, wherein the linkages of the mandrel members migrate on the guide arm 15 in the connecting members 15a. The guide arm 15 itself is connected to a pressure cell 16, which expands or contracts, depending on the pressure applied in the blowing head, in the direction of the center axis. The pressure cell can be designed, for example, as a bellows made of metal with a compression spring 17 provided therein.

In the operating state shown in FIG. 5, the pressure cell is compressed to a maximum; that is to say a "maximum system pressure $p_0$" exists in the blowing head, pressure which acts on the volume enclosed in the pressure cell 16. Thus, the mandrel members 7 are retracted to a maximum into the first nozzle parts 2, 3, 4.

In the operating state shown in FIG. 6, the pressure cell has been expanded to a maximum, that is to say a "minimum system pressure" exists in the blowing head, pressure which acts on the volume enclosed in the pressure cell 16. Thus, the mandrel members 7 are moved out to a maximum from the first nozzle parts 2, 3, 4, and they produce a maximum enlargement of the narrowest nozzle cross section.

As a result of this design, the adjustment drive 8 comprises a mechanical unit 15, 16, which is driven by the operating pressure $p_0$ of the blowing head, that is to say in principle pneumatically, by means of which the adjustment of the nozzle geometry can occur independently. In such a solution, one can in particular dispense with the control and feed lines leading to the blowing head 5. In addition, depending on the requirements, one can dispense with the incorporation of an electronic system in the blowing head.

It should be clear that the individual characteristics of the different embodiment examples can be reasonably combined with each other depending on the requirements.

The invention claimed is:

1. A device for injecting gas into a metallurgical vessel, comprising:
    a blowing head (5);
    a plurality of supersonic Laval nozzles (1) arranged on the blowing head (5), each Laval nozzle having at least one first nozzle part (2, 3) having an inlet section, an outlet section, and a throughput section (4) connecting the inlet and outlet section, and a second part (7) axially movable relative to the first part for changing a cross-section of the throughput section, whereby geometry of the Laval nozzle changes;
    a feed line (5*b*) for delivering gas to the blowing head (5); and
    an adjustment drive (11) for simultaneously displacing the second parts of at least some of the plurality of Laval nozzles to thereby change the geometry of the cross-section of the throughput sections of the at least some of the plurality of Laval nozzles,
    wherein the change in the geometry comprises a change of a smallest throughput cross-section (4, $A^*$) between the inlet section (2) and the outlet section (3, Ae),
    wherein the first nozzle part (2, 3) is designed as a channel with rotational symmetry about a channel axis (S), and the second nozzle part (7) is designed as a mandrel member (7) protruding along the channel axis (S) into the channel,
    wherein mandrel member (7) comprises a tapering tip (7*a*) extending into an area of the smallest throughput cross-section (4, $A^*$) of the channel, and
    wherein the adjustment drive (8) simultaneously displaces the mandrels (7) of the at least some of the plurality of Laval nozzles(1) along respective channel axes (S) for changing the cross-section of the throughput sections of the at least some of the plurality of Laval nozzles (1), and wherein the adjustment drive (8) comprises a die (10), a plurality of guides (13) in which respective second parts (7) are centrally displaceable about the respective channel axes of respective first parts (2, 3), and a plurality of connecting rods (12) attached at one end thereof to the die (10) and, at another end thereof, to the respective second parts (7), and means for displacing the die (10) in direction of a central axis of the blowing head (5).

2. Device according to claim 1, wherein the adjustment drive (8) comprises a hydraulic or pneumatic actuator.

3. Device according to claim 1, wherein the adjustment drive (8) comprises an electrical drive (11).

4. Device according to claim 1, wherein an electrical energy storage is provided in the area of the blowing head (5).

5. Device according to claim 1, wherein an electrical pressure sensor (14) is provided in the area of the blowing head (5).

6. Device according to claim 1, wherein the adjustment drive (8) is detachably secured on the blowing head (5).

7. A device for injecting gas into a metallurgical vessel, comprising:
    a blowing head (5);
    a plurality of supersonic Laval nozzles (1) arranged on the blowing head (5), each Laval nozzle having at least one first nozzle part (2, 3) having an inlet section, an outlet section, and a throughput section (4) connecting the inlet and outlet section, and a second part (7) axially movable relative to the first part for changing a cross-section of the throughput section, whereby geometry of the Laval nozzle changes;
    a feed line (5*b*) for delivering gas to the blowing head (5); and
    an adjustment drive (11) for simultaneously displacing the second parts of at least some of the plurality of Laval nozzles to thereby change the geometry of the cross-section of the throughput sections of the at least some of the plurality of Laval nozzles,
    wherein the change in the geometry comprises a change of a smallest throughput cross-section (4, $A^*$) between the inlet section (2) and the outlet section (3, Ae),
    wherein the first nozzle part (2, 3) is designed as a channel with rotational symmetry about a channel axis (S), and the second nozzle part (7) is designed as a mandrel member (7) protruding along the channel axis (S) into the channel,
    wherein mandrel member (7) comprises a tapering tip (7*a*) extending into an area of the smallest throughput cross-section (4, $A^*$) of the channel, and
    wherein the adjustment drive (8) simultaneously displaces the mandrels (7) of the at least some of the plurality of Laval nozzles(1) along respective channel axes (S) for changing the cross-section of the throughput sections of the at least some of the plurality of Laval nozzles (1), wherein the adjustment drive (8) comprises a mechanism operated by the pressure of the gas in a spring-pressurized chamber system (15, 16), with the spring-pressurized chamber system having no gas feed line.

8. Device according to claim 7, wherein the spring-pressurized chamber system comprises a pressure cell (16) formed as bellows, and a compresses spring (17) arranged in the bellows.

9. Device according to claim 8, wherein the bellows is made of metal.

* * * * *